United States Patent
Hernandez

(10) Patent No.: US 6,423,238 B2
(45) Date of Patent: Jul. 23, 2002

(54) METHOD FOR SEPARATING ENTRAINED AQUEOUS FROM LOADED ORGANIC IN AN SX PROCESS

(75) Inventor: Ramon A. Hernandez, Tucson, AZ (US)

(73) Assignee: Cyprus Amax Minerals Company, Phoenix, AZ (US)

( * ) Notice: Subject to any disclaimer, the term of this patent is extended or adjusted under 35 U.S.C. 154(b) by 0 days.

(21) Appl. No.: 09/909,303

(22) Filed: Jul. 19, 2001

Related U.S. Application Data

(62) Division of application No. 09/193,210, filed on Nov. 17, 1998, now Pat. No. 6,315,899.

(51) Int. Cl.$^7$ .......................... B01D 17/02; B01D 11/02
(52) U.S. Cl. ...................... 210/800; 210/805; 210/511; 210/537; 210/634
(58) Field of Search ................................ 210/634, 800, 210/805, 511, 537, 540

(56) References Cited

U.S. PATENT DOCUMENTS

| | | | |
|---|---|---|---|
| 47,333 A | 4/1865 | Robinson | |
| 405,047 A | 6/1889 | Newsome | 210/537 |
| 1,554,092 A | 9/1925 | Holmes | 210/537 |
| 1,557,340 A | 10/1925 | Sandmann | 210/537 |
| 1,750,922 A | 3/1930 | Cheakas et al. | 210/537 |
| 1,897,240 A | 2/1933 | Dahlgren | |
| 1,920,468 A | 8/1933 | Jones | 210/537 |
| 2,179,131 A | 11/1939 | Millard | 210/537 |
| 2,342,950 A | 2/1944 | Lovelady et al. | 183/2.7 |
| 2,793,751 A | 5/1957 | Broidrick | |
| 3,118,834 A | 1/1964 | Southworth et al. | 210/195 |
| 3,173,866 A | 3/1965 | Lefton et al. | 210/205 |
| 3,214,021 A | 10/1965 | Applebaum | 210/108 |
| 3,556,502 A | 1/1971 | Rheinlander et al. | 266/37 |
| 3,666,108 A | 5/1972 | In't Veld | 210/537 |
| 3,694,353 A | 9/1972 | Yang et al. | 210/537 |
| 3,804,252 A | 4/1974 | Rishel | |
| 3,899,299 A | 8/1975 | Bushnell et al. | 23/270.5 |
| 4,059,517 A | 11/1977 | Strahorn et al. | |
| 4,396,508 A | 8/1983 | Broughton | 210/187 |
| 4,483,695 A | 11/1984 | Covey, Jr. | 210/537 |
| 4,483,774 A | 11/1984 | Brill et al. | 210/788 |
| 4,664,802 A | 5/1987 | Lee | 210/537 |
| 5,173,179 A | 12/1992 | DeVoe et al. | 210/97 |
| 5,609,764 A | 3/1997 | Celi | 210/511 |
| 5,733,431 A | 3/1998 | Green et al. | 205/581 |
| 5,741,423 A | 4/1998 | Bates et al. | 210/634 |
| 6,315,899 B1 * | 11/2001 | Hernandez | 210/195.1 |

OTHER PUBLICATIONS

U.S. Patent Application No. 09/193,210, filed Nov. 17, 1998 for "Method and Apparatus for Separating Entrained Aqueous From Loaded Organic in an Sx Process" of Hernandez.
"SX–EW/Solvent Extraction–Electrowinning" published by MAGMA, 5 pages.
"Solvent Extraction of Copper—a Perspective" by B. Townson and K.J. Severs, Mining Journal Limited, 7 pages.

* cited by examiner

Primary Examiner—Robert J. Popovics
(74) Attorney, Agent, or Firm—Bruce E. Dahl, Esq.; Dahl & Osterloth, L.L.P.

(57) ABSTRACT

A method for separating a lighter liquid from a heavier liquid according to one embodiment of the present invention may comprise the following steps. First, the lighter liquid and the heavier liquid may be introduced into a settling tank and thereafter allowed to form a first upper liquid fraction and a first lower liquid fraction. The first upper liquid fraction may comprise the lighter liquid with residual amounts of the heavier liquid contained therein. The first upper liquid fraction is then decanted into a trough. The first upper liquid fraction decanted into the trough is then allowed to form a second upper liquid fraction and a second lower liquid fraction. The second lower liquid fraction may comprise the heavier liquid with residual amounts of the lighter liquid contained therein. The second lower liquid fraction is thereafter drained from the trough and allowed to form a third upper liquid fraction and a third lower liquid fraction.

20 Claims, 3 Drawing Sheets

METHOD FOR SEPARATING ENTRAINED AQUEOUS FROM LOADED ORGANIC IN AN SX PROCESS

CROSS REFERENCE TO RELATED APPLICATIONS

This application is a division of U.S. application Ser. No. 09/193,210, filed Nov. 17, 1998, now U.S. Pat. No. 6,315,899 which is incorporated herein by reference for all that it discloses.

FIELD OF INVENTION

This invention relates to solvent extraction processes in general and more specifically to a process for separating the organic phase from the aqueous phase in a solvent extraction process for removing copper from raw ore.

BACKGROUND

The overall efficiency of a copper mining operation depends in part on the techniques which are used to separate the copper from the raw ore. Many different methods have been developed over time to accomplish copper removal with a maximum degree of effectiveness. Of primary interest are various techniques which are collectively known as "solvent extraction," or "SX" for short, in which copper ions are leached or otherwise extracted from raw ore using chemical agents. Solvent extraction processes for removing copper ions are described in detail in U.S. Pat. No. 5,733,431, entitled "Method for Removing Copper Ions from Copper Ore Using Organic Extractions" which is incorporated herein by reference for all that it discloses.

Most solvent extraction or SX processes currently being used in the copper industry utilize a multi-stage process in which the raw ore is first contacted with an initial leaching solution or lixiviant. Representative lixiviants include, but are not limited to, sulfuric acid, acidic chloride solutions, nitrate solutions, ammonia, and ammonium salt compositions. The lixiviant leaches copper ions from the ore to generate a lixiviant product which consists of a copper ion concentrate (also known as a "pregnant leach solution"). The lixiviant product/copper ion concentrate is thereafter combined (e.g., mixed) with an organic extractant. The organic extractant removes the copper ions from the lixiviant product to generate a copper ion-rich organic solution. Many different organic extractants exist and may be obtained from any of a wide variety of commercial sources. By way of example, most commercially available organic extractant compositions typically consist of a mixture containing about 90–95% of a petroleum dilutant (e.g., kerosene or tridecanol) and about 5–10% hydroxyphenyl oxime. Prior to the combination of the organic extractant and the lixiviant product, the organic extractant will contain little or no copper ions therein (depending on whether a fresh or recycled extractant supply is involved) and is also known as a "barren organic extractant". During the mixture of these components, copper ions within the lixiviant product are transferred directly into the barren organic extractant. As a result, an organic phase and an aqueous phase are produced. The organic phase (also known as a "loaded organic extractant") consists of the organic extractant which contains copper ions extracted from the lixiviant product. The aqueous phase (also known as a "raffinate") consists of the lixiviant solution which lacks any substantial or appreciable amounts of dissolved copper therein. The organic phase is thereafter separated from the aqueous phase and is retained for further processing to extract the copper. The aqueous phase (i.e., raffinate) may be discarded, stored for future use, or immediately reused on additional amounts of ore.

A significant problem associated with the foregoing process relates to the separation of the organic phase (i.e., the loaded organic extractant) from the aqueous phase (i.e., the raffinate). While the two phases tend to separate into discrete layers based on substantial differences in polarity and other physical factors (e.g., specific gravity), as a matter of practice, some aqueous tends to remain with the loaded organic extractant and vice-versa. The presence of the aqueous phase in the organic phase can cause problems later on during the electrowinning process in which the copper is plated onto a cathode. For example, in some SX processes, the presence of the aqueous phase in the organic phase has the effect of transferring chloride into the pregnant electrolyte. In other processes, aqueous entrainment in the loaded organic has the effect of transferring iron to the pregnant electrolyte. Each contaminate has a negative effect on cathode quality, dictates a high plant bleed, and cuts production while increasing costs.

Partly in an effort to solve some of the foregoing problems, some SX processes have resorted to the use of coalescers in an attempt to perform an additional separation of the aqueous phase from the organic phase. While such coalescers are generally effective in removing additional amounts of entrained aqueous from the loaded organic, they are expensive and can be difficult to operate.

SUMMARY OF THE INVENTION

A method for separating a lighter liquid from a heavier liquid according to one embodiment of the present invention may comprise the following steps. First, the lighter liquid and the heavier liquid may be introduced into a settling tank and thereafter allowed to form a first upper liquid fraction and a first lower liquid fraction. The first upper liquid fraction may comprise the lighter liquid with residual amounts of the heavier liquid contained therein. The first upper liquid fraction is then decanted into a trough. The first upper liquid fraction decanted into the trough is then allowed to form a second upper liquid fraction and a second lower liquid fraction. The second lower liquid fraction may comprise the heavier liquid with residual amounts of the lighter liquid contained therein. The second lower liquid fraction is thereafter drained from the trough and allowed to form a third upper liquid fraction and a third lower liquid fraction.

BRIEF DESCRIPTION OF THE DRAWING

Illustrative and presently preferred embodiments of the invention are shown in the accompanying drawing in which.

DETAILED DESCRIPTION OF THE INVENTION

Liquid separation apparatus 10 for separating a lighter liquid from a heavier liquid is shown and described herein as it could be used to separate an organic phase (i.e., the lighter liquid) from an aqueous phase (i.e., the heavier liquid) in a solvent extraction process for removing copper from raw ore. Alternatively, the liquid separation apparatus and method according to the present invention could be used in any of a wide range of other processes wherein it is necessary or desirable to separate a lighter liquid from a heavier liquid.

Figure 1:
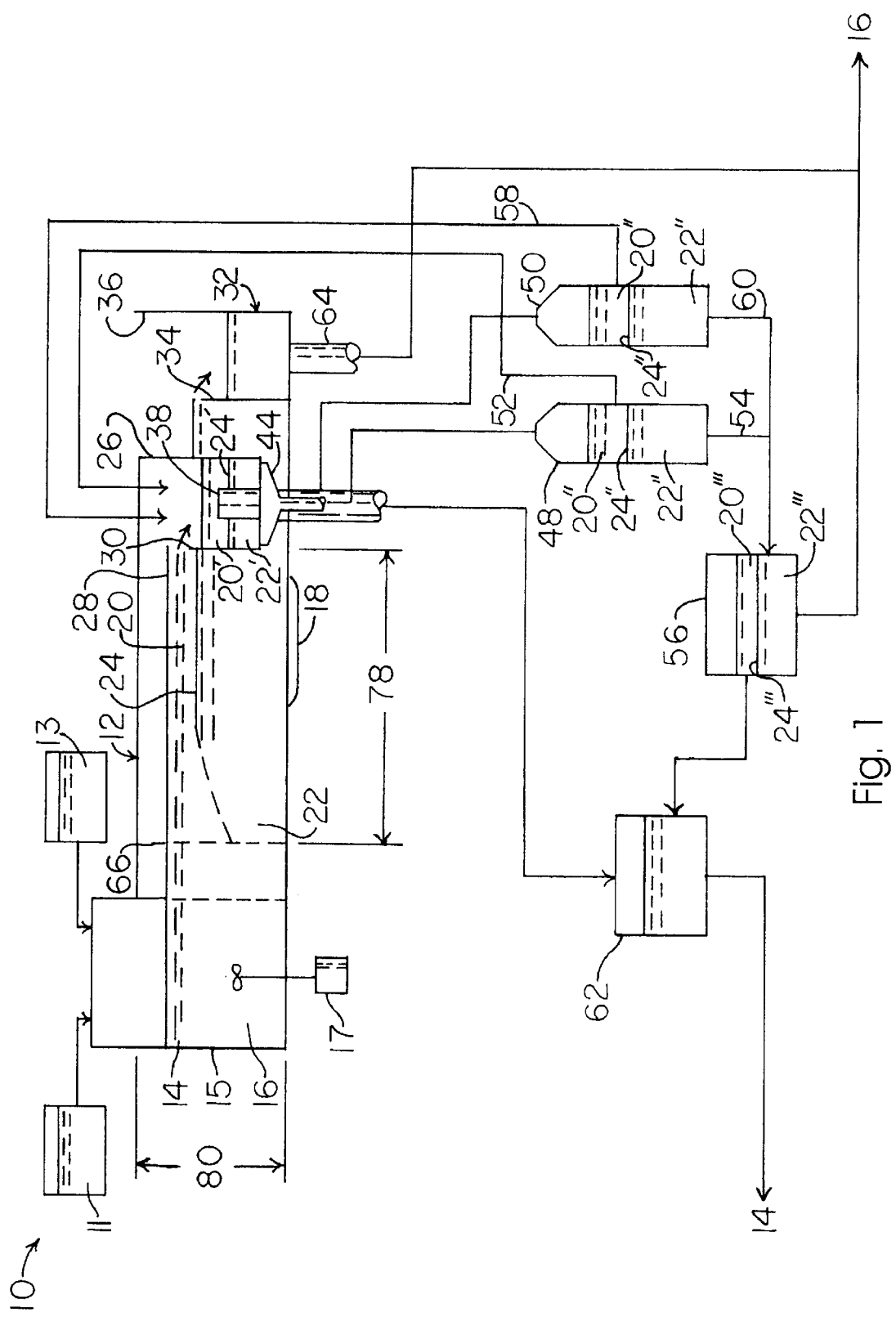
FIG. 1 is a side view in elevation of the liquid separation apparatus for separating a lighter liquid from a heavier liquid.
Figure 2:
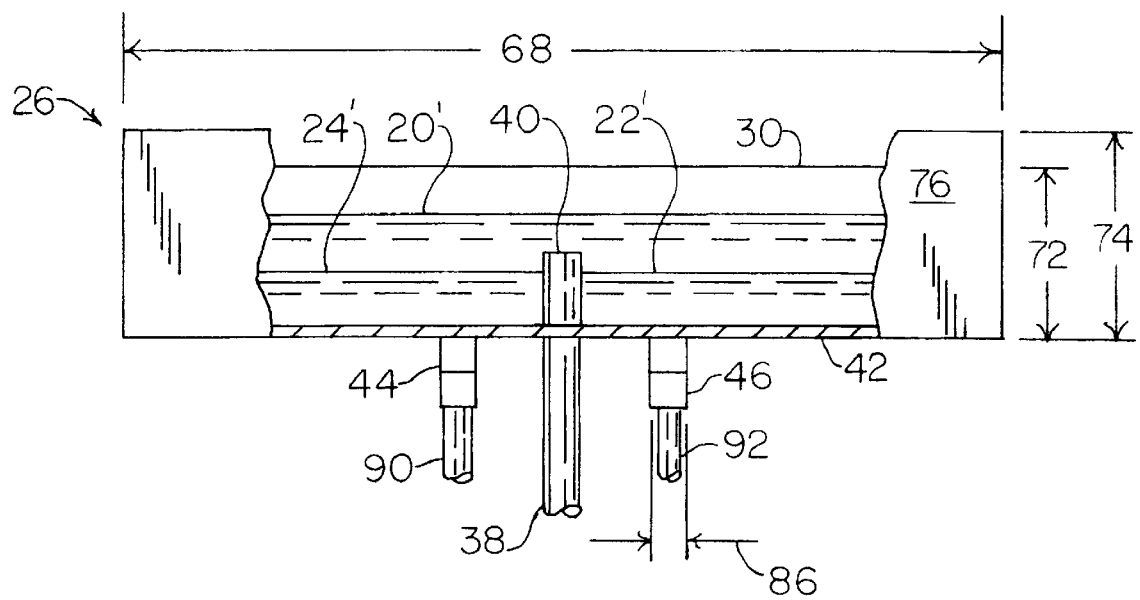
FIG. 2 is front view in elevation of the first trough and weir assembly showing the position of the first lighter fraction drain and the two sump drains.

Referring to FIGS. 1 and 2, the liquid separation apparatus 10 according to one preferred embodiment of the present invention may comprise a settling tank 12 sized to receive a mixture of a lighter liquid 14 and a heavier liquid 16. By way of example, in one preferred embodiment, the lighter liquid 14 may comprise a "loaded organic extractant" (i.e., the organic phase) whereas the heavier liquid 16 may comprise a "raffinate" (i.e., the aqueous phase). The settling tank 12 effects a first or primary separation of the lighter liquid 14 from the heavier liquid 16 in a quiescent zone 18. The lighter liquid 14 generally rises to the top of the quiescent zone 18 and forms a first upper liquid fraction 20, whereas the heavier liquid 16 settles to the bottom of the quiescent zone 18 and forms a first lower liquid fraction 22. In most applications, a first interface 24 forms between the upper and lower liquid fractions 20 and 22.

It should be noted that in most applications, a complete separation of the lighter and heavier liquids 14 and 16 generally will not occur in the settling tank 12. Accordingly, the upper liquid fraction 20 will also generally include residual amounts of the heavier liquid 16. That is, the upper liquid fraction 20 will generally comprise primarily the lighter liquid 14, but with residual amounts of the heavier liquid 16 entrained therein. Similarly, the lower liquid fraction 22 will generally comprise primarily the heavier liquid 16, but with residual amounts of the lighter liquid 14 entrained therein.

A weir 30 positioned adjacent the outlet end 28 of the settling tank 12 extends above the level of the first interface 24 separating the first upper and lower liquid fractions 20 and 22. Weir 30 allows substantially the first upper liquid fraction 20 to be removed (i.e., decanted) from the settling tank 12. A trough 26 positioned adjacent the weir 30 receives the first upper liquid fraction 20 discharged over the weir 30 and performs a secondary separation of the lighter and heavier liquids 14 and 16. That is, trough 26 permits the first upper liquid fraction 20 drawn from the settling tank 12 to separate into a second upper liquid fraction 20' and a second lower liquid fraction 22'. A second interface 24' may form between the second upper and lower liquid fractions 20' and 22'. As was the case for the first settling tank 12, the separation of the lighter and heavier liquids 14 and 16 effected in trough 26 is generally not complete. That is, the second lower liquid fraction 22' will generally comprise primarily the heavier liquid 16, but with residual amounts of the lighter liquid 14 contained therein.

Referring now primarily to FIG. 2, the first trough 26 may be provided with a first lighter fraction drain 38 having an inlet end 40 located at an elevated position above the floor 42 of trough 26. In one preferred embodiment, the elevated inlet end 40 of the first drain 38 is located above the second interface 24' contained within trough 26. Accordingly, the elevated inlet end 40 of first drain 38 removes from the trough 26 substantially the second upper liquid fraction 20'. The second upper liquid fraction 20' may thereafter be directed to a lighter fraction container 62 (FIG. 1) and held for further processing, as will be described in greater detail below. Trough 26 may also be provided with a pair of sump drains or traps 44 and 46 located on the bottom 42 of trough 26. The sump drains 44 and 46 are used to remove substantially the second lower fraction 22' from the trough 26.

Each sump drain 44, 46 may be connected to a respective column separator 48, 50 (FIG. 1), each of which performs a tertiary separation of the lighter and heavier liquids 14 and 16. That is, each column separator 48, 50 permits the second lower liquid fraction 22' drawn from the trough 26 to form a third upper liquid fraction 20', and a third lower liquid fraction 22". The first column separator 48 may be provided with a lighter fraction return line 52 for returning to the trough 26 quantities of the third upper liquid fraction 20". Column separator 48 may also be provided with a drain line 54 for draining the third lower liquid fraction 22" from the column separator 48. In one preferred embodiment, the drain line 54 from column separator 48 may be connected to a second settling tank 56. The second column separator 50 may be essentially identical to the first column separator 48 and may comprise a lighter fraction return line 58 for returning to the trough 26 quantities of the third upper liquid fraction 20". A drain line 60 may be used to drain to the second settling tank 56 the third lower liquid fraction 22" from the second column separator 50.

In the embodiment shown and described herein, the second settling tank 56 may be used to perform a quaternary separation of the lighter and heavier liquids 14 and 16. That is, the second settling tank 56 permits the third lower liquid fraction 22" drawn from the column separators 48 and 50 to separate into a fourth upper liquid fraction 20" and a fourth lower liquid fraction 22"'. The fourth upper liquid fraction 20"' may thereafter be directed to the lighter fraction container 62 and held for further processing. The fourth lower liquid fraction 22"" which comprises primarily the heavier liquid 16 (e.g., the aqueous phase or raffinate) may be withdrawn from the second settling tank 56 and reused or discarded, depending on the requirements of the particular process.

The liquid separation apparatus 10 may also be provided with a heavier fraction container or tank 32 that is fluidically connected to the settling tank 12 so that the first lower liquid fraction 22 from the settling tank 12 flows into the heavier fraction container or tank 32. In one preferred embodiment, the container 32 may be provided with a second weir 34 which, together with the container 32, defines a second trough 36. The second trough 36 may be provided with a drain 64 for removing the heavier liquid 16 from the second trough 36. The heavier liquid 16 (e.g., the aqueous phase or raffinate) withdrawn from the second trough 36 may be combined with the heavier liquid 16 withdrawn from the second settling tank 56 and reused or discarded, as the case may be.

Figure 4:
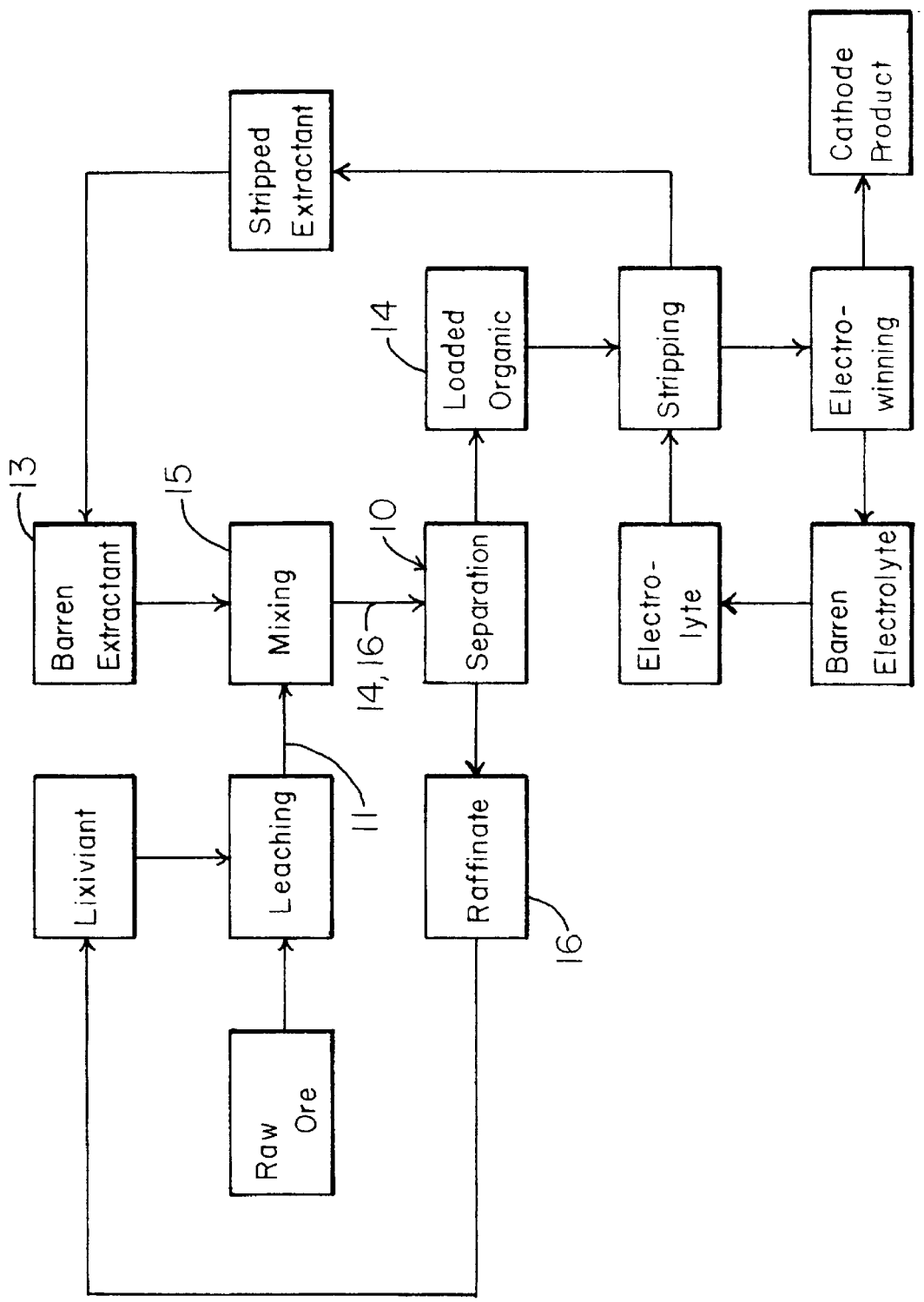
FIG. 4 is a schematic flow diagram illustrating the liquid separation apparatus as it may be used in a solvent exchange process to separate an organic phase from an aqueous phase.

Operation of the liquid separation apparatus 10 according to the present invention may be understood by considering its operation in a solvent extraction (i.e., SX) process of the type that may be used to remove copper from raw ore. Referring now to FIG. 4, the first step in such a process typically involves contacting the raw ore with an initial leaching solution or lixiviant. In one preferred embodiment, the lixiviant may comprise primarily the heavier liquid 16 or raffinate recovered by the liquid separation apparatus 10. Additional amounts of new lixiviant added, if necessary, to compensate for process losses. The lixiviant leaches copper ions from the raw ore to generate a lixiviant product or "pregnant leach solution". Thereafter, the pregnant leach solution 11 may be combined with a barren organic extractant 13 in a suitable mixing container 15. During the mixture of these components, copper ions contained in the pregnant leach solution 11 are transferred directly into the barren organic extractant 13. As a result, an organic phase (e.g., the lighter liquid 14) and an aqueous phase (e.g., the heavier liquid 16) are produced. The organic phase comprises primarily the loaded organic extractant (which contains copper ions captured from the pregnant leach solution). The aqueous phase (also known as raffinate) comprises primarily the lixiviant solution which lacks any substantial or appreciable amounts of dissolved copper therein.

In the foregoing SX process, the organic phase is generally less dense than the aqueous phase and the two phases tend to separate into discrete layers based on substantial differences in specific gravity and other physical factors (e.g., polarity). However, as a matter of practice, some of the aqueous phase (i.e., the raffinate) tends to remain with the organic phase (i.e., the loaded organic extractant). The liquid separation apparatus 10 according to the present invention is used to separate the aqueous and organic phases.

Referring back now to FIG. 1, the pregnant leach solution 11 may be combined with the appropriate quantity of barren organic extractant 13 in a suitable mixing container 15. A mixer or agitator 17 may be used to mix together the pregnant leach solution 11 and the barren organic extractant 13. During mixing, copper ions contained in the pregnant leach solution 11 are transferred to the barren organic extractant 13, resulting in the formation of the organic phase (i.e., the lighter liquid 14) and the aqueous phase (i.e., the heavier liquid 16). The two phases (i.e., the organic and aqueous) resulting from the mixture of the pregnant leach solution 11 and barren organic extractant 13 are thereafter allowed to enter the settling tank 12. In the quiescent zone 18, the organic phase (i.e., the lighter liquid 14) begins to separate from the aqueous phase (i.e., the heavier liquid 16). The result of the separation is the formation of the first upper liquid fraction 20 and the first lower liquid fraction 22. In the example SX process shown and described herein, the first upper liquid fraction 20 will consist primarily of the organic phase with residual amounts of the aqueous phase contained therein, whereas the first lower liquid fraction 22 will consist primarily of the aqueous phase with residual amounts of the organic phase contained therein.

The first weir 30 permits the first upper liquid fraction 20 contained within the quiescent zone 18 of settling tank 12 to be decanted into trough 26. The trough 26 effects a secondary separation of the organic and aqueous phases by allowing the first upper liquid fraction 20 drawn from the settling tank 12 to separate into a second upper liquid fraction 20' and a second lower liquid fraction 22'. Generally speaking, the secondary separation occurring in trough 26 will not be complete and, as a matter of practice, residual amounts of the organic phase will be retained in the second lower liquid fraction 22'.

The second upper liquid fraction 20' is drained from the trough 26 by the first lighter fraction drain 38. However, since the inlet end 40 of first drain 38 is located above the second interface 24', the first drain 38 removes primarily only the second upper liquid fraction 20', leaving behind the second lower liquid fraction 22'. The second upper liquid fraction 20' removed from the trough 26 may thereafter be discharged into the lighter fraction container 62 and held for subsequent processing. The second lower liquid fraction 22' contained in trough 26 is withdrawn via the two sump drains 44 and 46 and thereafter discharged into the two respective column separators 48 and 50. Each column separator 48, 50 effects a tertiary separation of the organic and aqueous phases by allowing the second lower liquid fraction 22' drawn from the trough 26 to separate into a third upper liquid fraction 20" and a third lower liquid fraction 22". The third upper liquid fraction 20" (comprising primarily the organic phase, but with some residual aqueous phase contained therein) is returned to the trough 26 via the lighter fraction return lines 52 and 58 associated with the respective column separators 48 and 50. The third lower liquid fraction 22" is drained from the column separators 48 and 50 and is discharged into the second settling tank 56.

The second settling tank 56 effects a quaternary separation of the organic and aqueous phases by allowing the third lower liquid fraction 22" to separate into a fourth upper liquid fraction 20"' and a fourth lower liquid fraction 22"'. The fourth upper liquid fraction 20"' may be directed to the lighter fraction container 62, whereupon it may be held for further processing. The fourth lower liquid fraction 22"' may be combined with the raffinate removed from the drain 64 associated with the second trough 36.

The loaded organic phase (i.e., the lighter liquid 14) recovered by the liquid separation apparatus 10 and contained in tank 62 may thereafter be processed to recover the copper ions contained therein by any of a wide range of processes that are well known in the art. For example, referring back now to FIG. 4, in one preferred embodiment, the loaded organic phase 14 contained in container 62 may be "stripped" by combining it with a suitable electrolyte. The electrolyte strips the copper ions from the loaded organic phase to produce barren or "stripped" organic extractant and a pregnant electrolyte. The stripped organic extractant may then be recycled and reused in the SX process just described. The pregnant electrolyte may then be directed into suitable tanks or cells wherein the copper ions contained in the pregnant electrolyte are plated onto cathode mother blanks in a process commonly referred to as electrowinning. However, since such subsequent processing steps (e.g., stripping and electrowinning) are well-known in the art and are not required to practice the present invention, such subsequent processing steps will not be described in further detail herein.

A significant advantage of the liquid separation apparatus 10 according to the present invention is that it effectively removes entrained aqueous from the organic phase, thereby reducing or eliminating the problems associated with the presence of entrained aqueous in the loaded organic phase, including problems associated with the presence of chloride and/or iron in the pregnant electrolyte solution. The present invention also requires no moving parts, and is thus easy and inexpensive to install and maintain.

Having briefly described the liquid separation apparatus and method according to the present invention, as well as some of their more significant features and advantages, the various embodiments of the method and apparatus for separating a heavier liquid and a lighter liquid will now be described in detail. However, before proceeding with the description, it should be noted that while the present invention is shown and described herein as it could be used to separate the organic phase from the aqueous phase in a solvent extraction process for removing copper from raw ore, it is not limited to use with any particular process. Indeed, the present invention could be used in any of a wide range of applications and processes wherein it would be desirable to effect a more complete separation of lighter and heavier liquids. Consequently, the present invention should not be regarded as limited to the particular examples and applications shown and described herein.

With the foregoing considerations in mind, the liquid separation apparatus 10 may comprise a settling tank 12 sized to receive the lighter liquid 14 and the heavier liquid 16. By way of example, in one preferred embodiment, the lighter liquid 14 may comprise a loaded organic extractant (e.g., an organic phase), whereas the heavier liquid 16 may comprise an aqueous phase or raffinate. In the embodiment shown and described herein, the settling tank 12 may be integrated with a mixing container 15 in which the pregnant leach solution 11 may be combined with the barren organic extractant 13. The mixing container 15 may be provided with a mechanical mixer or agitator 17 to more thoroughly mix the pregnant leach solution 11 with the barren organic extractant 13.

As was discussed above, the mixing of the pregnant leach solution 11 with the barren organic extractant 13 results in the formation of a loaded organic extractant (i.e., the organic phase) and a raffinate (i.e., the aqueous phase). The loaded organic extractant will be referred to hereinafter as the lighter liquid 14, whereas the raffinate will be referred to hereinafter as the heavier liquid 16. The mixture of the lighter and heavier liquids 14 and 16 may be directed to the settling tank 12 after passing through one or more "picket fences" baffles 66.

Continuing now with the description, the settling tank 12 extends essentially from the picket fence or baffle 66 to an outlet end 28. The settling tank 12 includes a quiescent zone 18 therein which permits the formation of a first upper liquid fraction 20 and a first lower liquid fraction 22. A first interface 24 separates the first upper and lower liquid fractions 20 and 22 and generally becomes more defined toward the outlet end 28 of settling tank 12.

The settling tank 12 may comprise any of a wide range of dimensions and holding capacities depending on the requirements of the particular process in which the liquid separation apparatus 10 is to be employed. Consequently, the present invention should not be regarded as limited to a settling tank 12 having any particular length, width, and height dimensions, nor any particular volume capacity. However, by way of example, in one preferred embodiment, the settling tank 12 comprises a generally rectangular structure having a length 78 of about 105 feet, a height 80 of about 3.5 feet, and a width of about 45 feet. The settling tank 12 may be fabricated from any of a wide range of materials (e.g., metals or concretes) suitable for the intended application. By way of example, in one preferred embodiment, the settling tank 12 is manufactured from 316 stainless steel, although other materials may also be used.

A weir 30 may be positioned adjacent the outlet end 28 of settling tank 12 and extends above the level of the first interface 24 separating the first upper and lower liquid layers 20 and 22. See FIG. 1. Accordingly, the weir 30 allows substantially the first upper liquid fraction 20 to be removed or decanted from the settling tank 12. By way of example, in one preferred embodiment, the weir 30 is located about 8–10 inches above the first interface 24, although the weir 30 may be positioned at other locations, so long as it is above the level of the first interface 24. A trough 26 positioned adjacent the weir 30 receives the first upper liquid fraction 20 discharged over the weir 30. As will be described in greater detail below, the trough 26 effects a secondary separation of the lighter and heavier liquids 14 and 16 by permitting the first upper liquid fraction 20 to separate into a second upper liquid fraction 20' and a second lower liquid fraction 22'. The second upper and lower liquid fractions 20' and 22' may become separated by a second interface 24', as shown in FIGS. 1 and 2.

The trough 26 may have overall dimensions and a volume capacity commensurate with the overall volume flow-rate of the first upper liquid fraction 20 that is expected to be produced by the settling tank 12. Consequently, the present invention should not be regarded as limited to a trough 26 having any particular dimensions or volume capacity. However, by way of example, in one preferred embodiment, the first trough 26 may have a width 68 (FIG. 2) commensurate with the width of the settling tank 12 (e.g., about 45 feet) and a length 70 (FIG. 3) of about 39 inches. The height 72 of the weir 30 may be about 22 inches, whereas the height 74 of the end wall 76 is about 33 inches. The first trough 26 may be made from any of a wide range of materials (such as metals or plastics) suitable for the intended application. By way of example, in one preferred embodiment, the first trough 26 is fabricated from 316 stainless steel.

The trough 26 may be provided with a first lighter fraction drain 38 having an inlet end 40 that is located at an elevated position above the floor 42 of trough 26. Generally speaking, it will be preferable to position the elevated inlet end 40 of the first drain 38 so that it is located above the second interface 24' separating the second upper and lower liquid fractions 20' and 22', respectively. By way of example, in one preferred embodiment, the inlet end 40 of first drain 38 is positioned about 15 inches above the floor 42 of the trough 26. The first drain 38 may discharge into a lighter fraction container 62, as best seen in FIG. 1.

Figure 3:
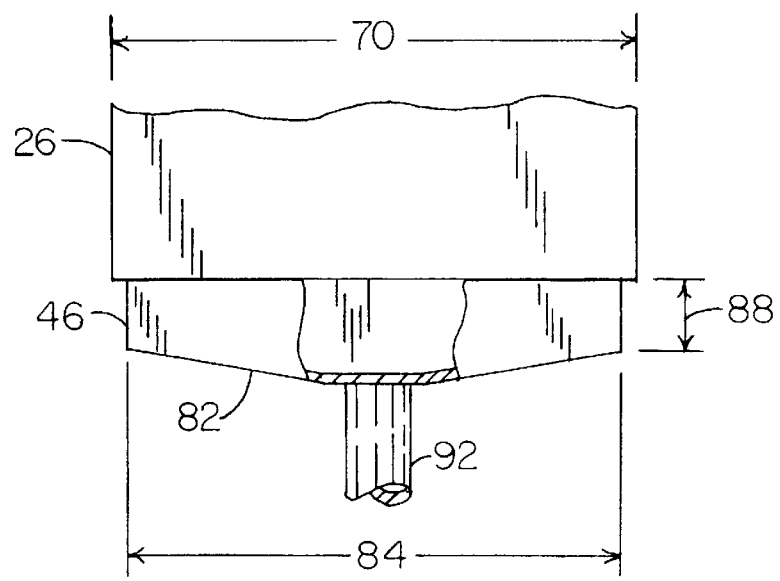
FIG. 3 is a side view in elevation of one of the sump drains.

The trough 26 may also be provided with a pair of sump drains or traps 44 and 46 located on the bottom 42 of trough 26. In the embodiment shown and described herein, the sump drains or traps 44 and 46 are positioned on either side of the first drain 38. Alternatively, the sump drains 44 and 46 may be located at any convenient position along the bottom 42 of trough 26. In still another arrangement, the sump drains 44 and 46 may be located on the lower portions of the sides of trough 26, so long as they are located below the second interface 24'. Referring now primarily to FIG. 3, the sump drains 44 and 46 are essentially identical and may comprise a sump portion 82 that opens into the trough 26. Drain pipes 90, 92 connected to the respective sump drains 44, 46 may be used to direct liquid from the sump drains 44, 46 to the respective column separators 48, 50.

The sump drains 44, 46 may be made from any of a wide range of materials, such as metals or plastics, suitable for the intended application. Moreover, each sump drain 44, 46 may be sized to remove liquid at a rate sufficient to prevent the trough 26 from overflowing. Consequently, the present invention should not be regarded as limited to sump drains being fabricated from any particular material or to any particular size. By way of example, in one preferred embodiment, both sump drains 44, 46 are fabricated from 316 stainless steel. Each sump drain 44, 46 may have a length 84 of about 36 inches, a width 86 of about 4 inches, and a depth 88 of about 4 inches. Drain pipes 90 and 92 may comprise pipes fabricated from PVC (polyvinylchloride) plastic and having diameters of about 2 inches. Alternatively, pipes fabricated from other materials or having different sizes could also be used.

Referring back now to FIG. 1, each sump drain 44, 46 discharges into a respective column separator 48, 50, each of which performs a tertiary separation of the lighter and heavier liquids 14, 16 contained in the second lower liquid fraction 22' drawn from the trough 26. That is, each column separator 48, 50 allows the second lower fraction 22' drawn from the trough 26 to form a third upper liquid fraction 20" and a third lower liquid fraction 22". A third interface 24" may form between the third upper and lower liquid fractions 20" and 22", respectively. The first column separator 48 may be provided with a lighter fraction return line 52 located generally above the third interface 24" for returning to the trough 26 quantities of the third upper liquid fraction 20". Column separator 48 may also be provided with a drain line 54 for draining the third lower liquid fraction 22" from the column separator 48. The drain line 54 may discharge the third lower liquid fraction 22" into a second settling tank 56. The second column separator 50 may be essentially identical to the first column separator 48 and may include a lighter fraction return line 58 located above the third interface 24" for returning to the trough 26 quantities of the third upper liquid fraction 20". A drain line 60 may be used to drain to the second settling tank 56 the third lower fraction 22" from the second column separator 50.

The first and second column separators 48 and 50 may comprise any of a wide range of column separators well-known in the art and that are readily commercially available. Consequently, the present invention should not be regarded as limited to any particular type or style of column separator. By way of example, in the embodiment shown and described herein, each column separator 48, 50 may comprise a generally cylindrical member having a height of about 5 feet and a diameter of about 8 inches. The column separators 48 and 50 may be made from any of a wide range of materials suitable for the intended application, as would be obvious to persons having ordinary skill in the art. By way of example, each column separator 48, 50 in one preferred embodiment is fabricated from HDPE (high-density polyethylene), although other materials could also be used. The various drain lines 52, 54, 58, and 60 may comprise PCV pipes having diameters of about 1 inches, although pipes fabricated from other materials and having different diameters could also be used.

The drain lines 54 and 60 from the first and second column separators 48 and 50 may be connected to the second settling tank 56. The second settling tank 56 may be used to perform a quaternary separation of the lighter and heavier liquids 14 and 16 contained in the third lower liquid fraction 22" drawn from the column separators 48 and 50. That is, the second settling tank 56 permits the third lower liquid fraction 22" drawn from the column separators 48 and 50 to separate into a fourth upper liquid fraction 20''' and a fourth lower liquid fraction 22'''. The fourth upper and lower liquid fractions 20''' and 22''' may become separated by a fourth interface 24'''. The fourth upper liquid fraction 20''' may thereafter be directed to the lighter fraction container 62. The fourth lower liquid fraction 22''', which comprises primarily the heavier liquid 16 (e.g., the aqueous phase or raffinate), may be withdrawn from the second settling tank 56 and reused or discarded, depending on the requirements of the particular process.

The second settling tank 56 and the lighter fraction container 62 may comprise any of a wide range of containers having sizes suitable for the liquid flow rates expected in the particular process. However, since such containers are well-known in the art and are readily commercially available, the second settling tank 56 and lighter fraction container 62 utilized in one preferred embodiment of the invention will not be described in further detail herein.

Still referring to FIG. 1, the liquid separation apparatus 10 may also be provided with a heavier fraction container or tank 32 that is fluidically connected to the settling tank 12 so that the first lower liquid fraction 22 from the settling tank 12 flows into the heavier fraction container or tank 32. In one preferred embodiment, the container 32 comprises an integral extension of the settling tank 12, although other configurations are possible, as would be obvious to persons having ordinary skill in the art. The container 32 may be provided with a second weir 34 which, together with the container 32, defines a second trough 36. The second trough 36 may be provided with a drain 64 for removing the heavier liquid 16 from the second trough 36. The heavier liquid 16 (e.g., the aqueous phase or raffinate) withdrawn from the second trough 36 may be combined with the heavier liquid 16 withdrawn from the second settling tank 56 and reused or discarded, as the case may be.

Operation of the liquid separation apparatus 10 according to the present invention may be understood by considering its operation in a solvent extraction (i.e., SX) process of the type that may be used to remove copper from raw ore. Referring now to FIG. 4, the first step in such a process typically involves contacting the raw ore with an initial leaching solution or lixiviant. The lixiviant leaches copper ions from the ore to generate a lixiviant product or "pregnant leach solution" 11. The pregnant leach solution 11 thereafter may be combined with a barren organic extractant 13 in container 15. See also FIG. 1. During the mixture of these components, copper ions contained in the pregnant leach solution 11 are transferred directly into the barren organic extractant 13. As a result, an organic phase and an aqueous phase are produced. The organic phase comprises primarily the loaded organic extractant (which contains copper ions captured from the pregnant leach solution). The aqueous phase (also known as raffinate) comprises primarily the lixiviant solution which lacks any substantial or appreciable amounts of dissolved copper therein.

In the foregoing SX process, the organic phase is generally less dense than the aqueous phase and the two phases tend to separate into discrete layers based on substantial differences in specific gravity and other physical factors (e.g., polarity). However, as a matter of practice, some of the aqueous phase (i.e., the raffinate) tends to remain with the organic phase (i.e., the loaded organic extractant). The liquid separation apparatus 10 according to the present invention is used to separate the aqueous and organic phases.

Referring now to FIG. 1, the pregnant leach solution 11 may be combined with the appropriate quantity of barren organic extractant 13 in the container 15, whereupon they are mixed together with the aid of the mixer or agitator 17. During the mixing process, copper ions contained in the pregnant leach solution are transferred to the barren organic extractant 13 to form the organic phase (i.e., the lighter liquid 14) and the aqueous phase (i.e., the heavier liquid 16). The two phases (i.e., the organic and aqueous) resulting from the mixture of the pregnant leach solution 11 and barren organic extractant 13 are thereafter allowed to enter the settling tank 12 after passing through the baffle or "picket fence" separating the settling tank 12 from the mixing container 15. Once in the settling tank 12, the organic phase (i.e., the lighter liquid 14) begins to separate from the aqueous phase (i.e., the heavier liquid 16), ultimately forming the first upper liquid fraction 20 and the first lower liquid fraction 22. In the example SX process shown and described herein, the first upper liquid fraction 20 will consist primarily of the organic phase with residual amounts of the aqueous phase contained therein, whereas the first lower liquid fraction 22 will consist primarily of the aqueous phase with residual amounts of the organic phase contained therein.

The first weir 30 permits the first upper liquid fraction 20 contained within the quiescent zone 18 of settling tank 12 to decant into trough 26. The trough 26 effects a secondary separation of the organic and aqueous phases by allowing the first upper liquid fraction 20 drawn from the settling tank 12 to separate into a second upper liquid fraction 20'

(comprising primarily the organic phase) and a second lower liquid fraction 22'(comprising primarily the aqueous phase). Generally speaking, the secondary separation occurring in trough 26 will not be complete and residual amounts of the organic phase will be retained in the second lower liquid fraction 22'.

The second upper liquid fraction 20' is drained from the trough 26 by the first lighter fraction drain 38. However, since the inlet end 40 of first lighter fraction drain 38 is positioned above the second interface 24', the first drain 38 removes primarily only the second upper liquid fraction 20'. The second upper liquid fraction 20' removed from the trough 26 by the first drain 38 thereafter may be discharged into the lighter fraction container 62 and held for subsequent processing. The second lower liquid fraction 22' from trough 26 is withdrawn via the two sump drains 44 and 46 and thereafter discharged into the two respective column separators 48 and 50. Each column separator 48, 50 effects a tertiary separation of the organic and aqueous phases by allowing the second lower liquid fraction 22" from the trough 26 to separate into a third upper liquid fraction 20" and a third lower liquid fraction 22". The third upper liquid fraction 20" (comprising primarily the organic phase, but with some residual aqueous phase contained therein) is returned to the trough 26 via the lighter fraction return lines 52 and 58. The third lower liquid fraction 22" is drained from the column separators 48 and 50 and is discharged into the second settling tank 56.

The second settling tank 56 effects a quaternary separation of the organic and aqueous phases by allowing the third lower liquid fraction 22" to separate into a fourth upper liquid fraction 20'" and a fourth lower liquid fraction 22'". The fourth upper liquid fraction 20'" may be directed to the lighter fraction container 62 and held for further processing. The fourth lower liquid fraction 22'" may be combined with the raffinate removed from the drain 64 associated with the second trough 36.

The loaded organic phase (i.e., the lighter liquid 14) recovered by the liquid separation apparatus 10 and contained in tank 62 thereafter may be processed to recover the copper ions contained therein. For example, referring back now to FIG. 4, in one preferred embodiment, the loaded organic phase 14 contained in tank 62 may be "stripped" by combining it with a suitable electrolyte. The electrolyte strips the copper ions from the loaded organic phase to produce barren or stripped organic extractant and a pregnant electrolyte. The stripped organic extractant may then be recycled and reused in the SX process just described. The pregnant electrolyte may then be directed into suitable tanks or cells wherein the copper ions contained in the pregnant electrolyte are plated onto cathode mother blanks in a process known generally as electrowinning.

It is contemplated that the inventive concepts herein described may be variously otherwise embodied and it is intended that the appended claims be construed to include alternative embodiments of the invention except insofar as limited by the prior art.

What is claimed is:

1. A method for separating a lighter liquid from a heavier liquid, comprising:
    introducing the lighter liquid and the heavier liquid into a settling tank;
    permitting the lighter liquid and the heavier liquid to form first upper and lower liquid fractions, the first upper liquid fraction comprising the lighter liquid with residual amounts of the heavier liquid contained therein;
    permitting the first upper liquid fraction in the settling tank to decant into a trough;
    permitting the first upper liquid fraction decanted into the trough to form second upper and lower liquid fractions, the second lower liquid fraction comprising the heavier liquid with residual amounts of the lighter liquid contained therein;
    draining the second lower liquid fraction from the trough; and
    permitting the second lower liquid fraction drained from the trough to form third upper and lower liquid fractions.

2. The method of claim 1, further comprising the step of permitting the second upper liquid fraction in the trough to decant into a lighter fraction container.

3. The method of claim 2, further comprising the step of permitting the third upper liquid fraction to decant into the trough.

4. The method of claim 3, further comprising the step of permitting the third lower liquid fraction to form fourth upper and lower liquid fractions.

5. The method of claim 4, further comprising the step of permitting the fourth upper liquid fraction to decant into the lighter fraction container.

6. The method of claim 1, further comprising the step of permitting the third lower liquid fraction to form fourth upper and lower liquid fractions.

7. The method of claim 6, wherein the step of permitting the third lower liquid fraction to form fourth upper and lower liquid fractions comprises the step of permitting an interface substantially separating the fourth upper and lower liquid fractions to form.

8. The method of claim 6, wherein the step of permitting the third lower liquid fraction to form fourth upper and lower liquid fractions comprises the steps of:
    permitting the third lower liquid fraction to decant into a second settling tank; and
    permitting an interface substantially separating the fourth upper and lower liquid fractions to form within the second settling tank.

9. The method of claim 8, further comprising the steps of:
    draining the fourth lower liquid fraction from the second settling tank; and
    permitting the fourth upper liquid fraction to decant into a lighter fraction container.

10. The method of claim 1, wherein the step of introducing the lighter liquid and heavier liquid into a settling tank comprises the step of permitting the lighter liquid and the heavier liquid to pass through a baffle, the lighter liquid and the heavier liquid entering the settling tank by passing through the baffle.

11. The method of claim 1, wherein the step of permitting the lighter liquid and the heavier liquid to form first upper and lower liquid fractions comprises the step of permitting an interface substantially separating the first upper and lower liquid fractions to form within the settling tank.

12. The method of claim 11, wherein the interface forms within a quiescent zone within the settling tank.

13. The method of claim 1, wherein the step of permitting the first upper liquid fraction in the settling tank to decant into a trough comprises the step of permitting substantially the first upper liquid fraction in the settling tank to be discharged over a weir into the trough.

14. The method of claim 1, further comprising the step of draining the first lower liquid fraction from the settling tank.

15. The method of claim 14, wherein the step of draining the first lower liquid fraction from the settling tank comprises the step of permitting the first lower liquid fraction in the settling tank to flow into a heavier fraction tank.

16. The method of claim 14, wherein the step of draining the first lower liquid fraction from the settling tank comprises the step of permitting the first lower liquid fraction in the settling tank to decant into a second trough.

17. The method of claim 16, wherein the step of permitting the first lower liquid fraction in the settling tank to decant into a second trough comprises the step of permitting substantially the first lower liquid fraction in the settling tank to be discharged over a second weir into the second trough.

18. The method of claim 1, wherein the step of permitting the first upper liquid fraction decanted into the trough to form second upper and lower liquid fractions comprises the step of permitting an interface substantially separating the second upper and lower liquid fractions to form within the trough.

19. The method of claim 1, wherein the step of draining the second lower liquid fraction from the trough comprises the step of permitting substantially the second lower liquid fraction to flow into a column separator.

20. The method of claim 1, wherein the step of permitting the second lower liquid fraction drained from the trough to form third upper and lower liquid fractions comprises the step of permitting an interface substantially separating the second upper and lower liquid fractions to form.

* * * * *

UNITED STATES PATENT AND TRADEMARK OFFICE
CERTIFICATE OF CORRECTION

PATENT NO.    : 6,423,238 B2                                    Page 1 of 1
DATED         : July 23, 2002
INVENTOR(S)   : Ramon A. Hernandez It is certified that error appears in the above-identified patent and that said Letters Patent is hereby corrected as shown below:

<u>Column 4,</u>
Line 8, please delete the reference number "20'" and insert therefor the reference number -- 20" --;
Line 28, please delete the reference number "20''" and insert therefor the reference number -- 20''' --;
Line 29, please delete the reference number "22''" and insert therefor the reference number -- 22''' --;
Line 30, please delete the reference number "20''" and insert therefor the reference number -- 20''' --;
Line 32, please delete the reference number "22'''" and insert therefor the reference number -- 22''' --;
Line 63, please insert the reference number -- 11 -- after the phrase "pregnant leach solution" and before the end of sentence period so that the correction reads:
-- "pregnant leach solution" 11. --

<u>Column 11,</u>
Line 20, please delete the reference number "22''" and insert the reference number -- 22' --.

Signed and Sealed this

Twenty-third Day of March, 2004

JON W. DUDAS
*Acting Director of the United States Patent and Trademark Office*